United States Patent [19]
Yamamoto

[11] Patent Number: 5,576,832
[45] Date of Patent: Nov. 19, 1996

[54] OPTICAL MEASURING APPARATUS AND MEASURING METHOD OF THE SAME

[75] Inventor: Fumio Yamamoto, Kure, Japan

[73] Assignee: Mitutoyo Corporation, Tokyo, Japan

[21] Appl. No.: 498,248

[22] Filed: Jun. 29, 1995

Related U.S. Application Data

[63] Continuation of Ser. No. 91,346, Jul. 14, 1993, abandoned.

[30] Foreign Application Priority Data

Jul. 15, 1992 [JP] Japan .................................. 4-188114
Apr. 5, 1993 [JP] Japan .................................. 5-078106

[51] Int. Cl.$^6$ .................................................... G01B 9/08
[52] U.S. Cl. ...................... 356/391; 356/376; 250/559.36
[58] Field of Search ........................... 356/388, 391–393, 356/397, 154, 375, 376; 250/560, 561; 359/369, 798, 802

[56] References Cited

U.S. PATENT DOCUMENTS

| | | | |
|---|---|---|---|
| 2,592,264 | 4/1952 | Fultz | 356/391 |
| 3,930,150 | 12/1975 | Marantette | 356/391 |
| 3,966,331 | 6/1976 | Inuiya | 356/391 |
| 4,814,624 | 3/1989 | Veltze | 356/392 |

FOREIGN PATENT DOCUMENTS

| | | | |
|---|---|---|---|
| 0035106 | 2/1991 | Japan | 356/376 |
| 8805152 | 7/1988 | WIPO | 356/376 |

*Primary Examiner*—Hoa Q. Pham
*Attorney, Agent, or Firm*—Flynn, Thiel, Boutell & Tanis, P.C.

[57] ABSTRACT

An optical measuring apparatus and a method of the same wherein any two points, inside and outside of an optical picture image of a measuring object mounted on the table and projected by an optical system, are designated on a screen by a cursor and then the table and the optical system are moved relatively so that a line segment between the designated two points is detected to thereby take measurements for the measuring object.

15 Claims, 7 Drawing Sheets

OPTICAL MEASURING APPARATUS AND MEASURING METHOD OF THE SAME

This application is a continuation of U.S. Ser. No. 08/091,346, filed Jul. 14, 1993, now abandoned.

BACKGROUND OF THE INVENTION

1. Field of the Invention

This invention relates to an optical measuring apparatus having an optical system capable of focusing on a object mounted on a table to project a picture image of the object on a screen and a measuring method thereof and, more particularly, to an apparatus and a measuring method thereof wherein the object mounted on the table is illuminated and wherein a projector having an optical system to focus on the object to project an optical picture image of the measuring object on the screen is provided to measure the dimensions and shape of the object with a relative movement of the optical system and the measuring object.

2. Description of the Related Art

A so-called CNC projector, a projector which has previously been used, is adapted to move the optical system to project an optical picture image of a measuring object on a screen and a table to mount thereon the measuring object, relatively based upon a prepared measuring program thus to incorporate the relative movement value when an edge of the picture image is detected by an edge detecting Sensor to obtain the dimensions and the shape of the object.

To prepare of the measuring program for controlling the relative movement between the optical system and the table the CNC projector has been conducted by directly shifting the table on which the measuring object is mounted so that several measuring points coincide with a reticule, focus lines formed on the screen, or by inputting position data of the individual measuring points by means of a keyboard of the computer in the light of a specifications showing the measuring object.

This former system is disadvantageous in view of a working efficiency as the table should be shifted so that the measuring points precisely coincide with the reticle shown on the screen. The fine allocation of the table by different operators, each naturally having different skill in measurement, may influence a measuring accuracy.

The current system is also disadvantageous to attain reduced time of the measuring procedure since each of the position data of the measuring points should be inputted through the keyboard in the light of the specifications showing the measuring object, which may require certain ability to operate the keyboard to thereby disturb popularity of the CNC projector.

The present invention aims to provide a desirable optical measuring apparatus and a measuring method thereof so that the above mentioned disadvantages can be solved and anyone can designate the measuring points simply and instantly.

SUMMARY OF THE INVENTION

This invention is directed to an optical measuring apparatus having an optical system. For protecting an object mounted on a table. The optical measuring apparatus of this invention includes: an edge detecting sensor oriented to detect the edge of the optical picture image; a cursor adapted to move on the screen; a cursor position coordinate value detecting means for detecting instant position coordinate values of the cursor on the screen where the optical picture image is projected. The invention also includes an operation control means for (A): preparing a measuring program for relatively moving the optical system and the table so that a line segment including a point designated by the cursor is detected by the edge detecting sensor, (B): relatively moving the optical system and the table in accordance with the thus-prepared measuring program, and (C): measuring the relative movement value when detecting an edge of the picture image by the edge detecting sensor to thereby take measurements for the measuring object.

The line segment could be defined by two end points thereof by means of the cursor or could be in a state to extend from the point designated by the cursor in a predetermined direction with a certain length.

The line segment could be a straight line or a curved line. The relative movement by the operation control means can be conducted by a movement of the table or the optical system.

The cursor position coordinate value detecting means has, on the screen, a grid pattern made from conductors of electricity which lay in a certain intervals therebetween along two axis directions perpendicularly intersecting each other and into which successive scan pulses are applied.

The detecting part of the edge detecting sensor can be accompanied in the cursor which is adapted to be temporarily allocated at a certain place on the screen. The edge detecting sensor is oriented in a coaxial relationship with a central optical axis of the optical picture image projected by the optical system to detect a change of intensity of light to thereby confirm a passage of the edge of the optical picture image. The relative movement controlled by the operation control means effects a movement of the table relatively to the optical system so that the edge detecting sensor detects the passage of the line segment.

An optical measuring apparatus having an optical system to project, on a screen, a measuring object mounted on a table as an optical picture image thereof, the optical measuring apparatus comprises: an edge detecting sensor oriented at a portion of the screen to detect therethrough a passage of an edge of the optical picture image; a bright board formed in a flat shape and made from a bright material; a cursor adapted to move on the screen and the bright board; a first cursor position coordinate value detecting means for detecting an instant position coordinate value of the cursor when allocated inside of the optical picture image; a second cursor position coordinate value detecting means for detecting an instant position coordinate value of the cursor when allocated outside of the optical picture image; an operation control means for (A): preparing a measuring program for relatively moving the optical system and the table so that a line segment including a point designated by the cursor is detected by the edge detecting sensor, (B): relatively moving the optical system and the table in accordance with the thus-prepared measuring program, and (C): measuring the relative movement value when detecting an edge of the picture image by the edge detecting sensor to thereby take measurements for the measuring object.

The line segment is defined by two end points thereof by means of the cursor. The line segment extends from the point designated by the cursor in a predetermined direction with a certain length.

The first cursor position coordinate value detecting means has, on the screen, a grid pattern made from conductors of electricity which lay in a certain intervals therebetween along two axis directions perpendicularly intersecting each other and into which successive scan pulses are applied, and wherein the second cursor position coordinate value detecting means has, on the bright board, a grid pattern made from conductors of electricity which lay in a certain intervals therebetween along two axis directions perpendicularly intersecting each other and into which successive scan pulses are applied.

The optical measuring apparatus can further comprise a switching device to deliver signals outputted from the cursor to the first cursor position coordinate value detecting means or to the second cursor position coordinate value detecting means.

An optical measuring method to take measurements of a measuring object after projecting on a screen the measuring object mounted on a table by means of an optical system as an optical picture image thereof, the optical measuring method comprises the steps of; designating plural points inside of the optical picture image projected on the screen by means of a cursor and detecting position coordinate values of the designated point; moving the table and the optical system relatively so that a line segment including a point designated by the cursor is detected and measuring a relative movement value when detecting an edge of the picture image to thereby take measurements for the measuring object.

The line segment could be defined by two end points thereof by means of the cursor or extends from the point designated by the cursor in a predetermined direction with a certain length.

The present invention can provide a desirable optical measuring apparatus and a measuring method thereof so that the above mentioned disadvantages can be solved and anyone can designate the measuring points simply and instantly.

DETAILED DESCRIPTION OF THE PREFERRED EMBODIMENT(S)

The above objects of the present invention will become more fully apparent with reference to the following specification and drawings which relate to several preferred embodiments of the present invention.

First embodiment

An optical measuring apparatus according to the first embodiment of the present invention is depicted in FIGS. 1–5. As can be seen from FIG. 1, the first optical measuring apparatus comprises: a projector 1 having an optical system which is capable of applying rays of light to one side of an M to project an optical picture image of the object; A cursor 2 is adapted to manually designate a plurality of measuring points on the optical picture image focused by the projector 1. An edge detecting sensor 26 (FIGS. 3 and 4) is provided in the cursor 2 to detect the border of the picture image. A cursor position coordinate value detecting device 3 for detecting an instant position coordinate value of the cursor 2 system also includes an operation control device 4 which functions to (A): prepare a preferable measuring program for the optical system and the object M based on the detected position coordinate value of the cursor 2 by means of the cursor position coordinate value detecting device 3, (B): relatively move the optical system and the object M according to the prepared measuring program, and (C): measure a relative movement value when detecting an edge of the picture image to thereby take measurements for the measuring object. Incidentally, a reference numeral 5 in the drawings designates a stand to mount thereon the cursor coordinate value detecting device 3 and the operation control device 4.

Figure 1:
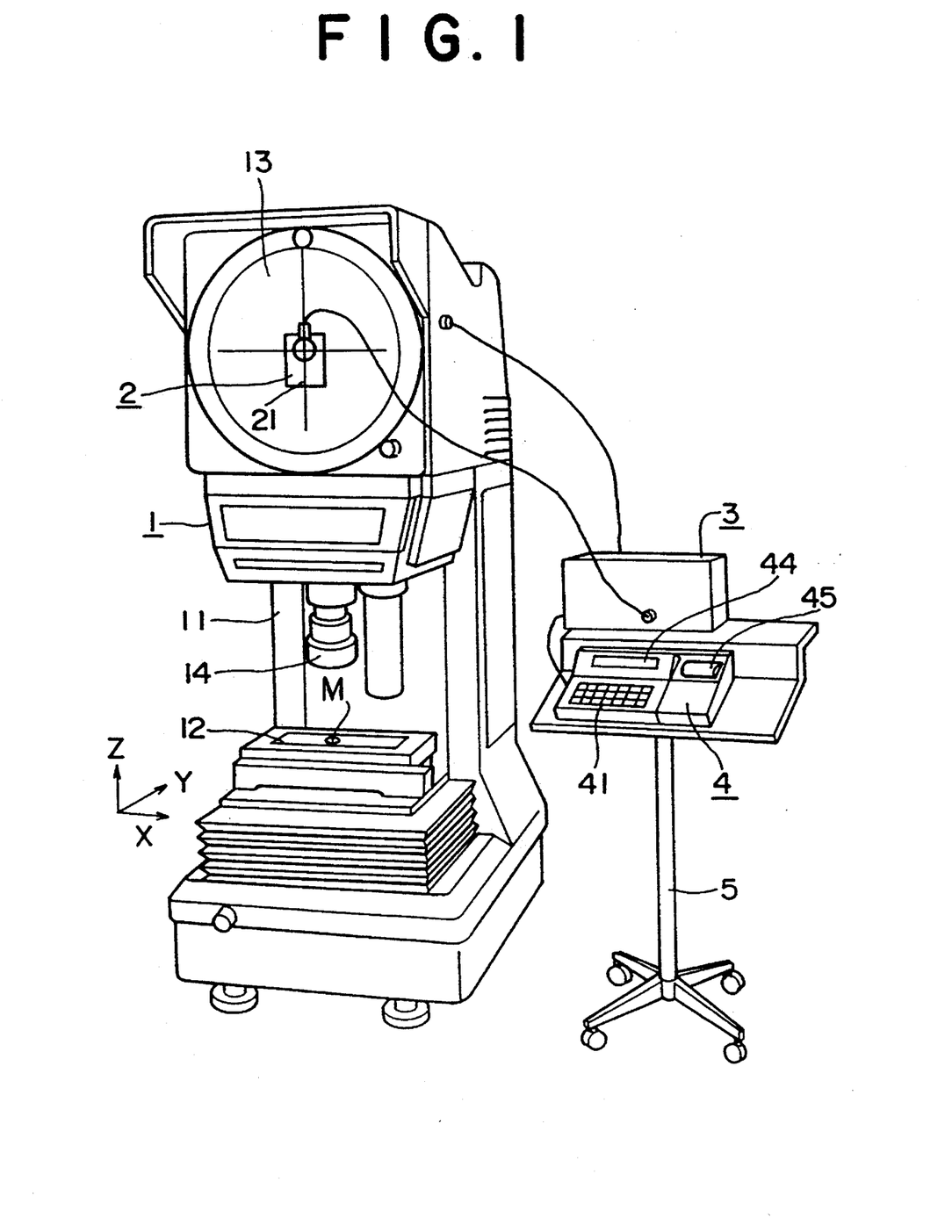
FIG. 1 is a perspective view of the appearance of the overall composition of the optical measuring apparatus according to the first embodiment of the present invention.

The projector 1 includes a projector main body 11. The projector main body 11 has a table 12 to support thereon the object M in a state to optionally move in the X-, Y- and Z-directions respectively. The protector has coordinately and an optical system 14 to focus into the object supported on the table 12 by applying light to the lower surface of the measuring object from inside of the table so that the optical picture image of the object is projected on a screen 13.

Figure 4:
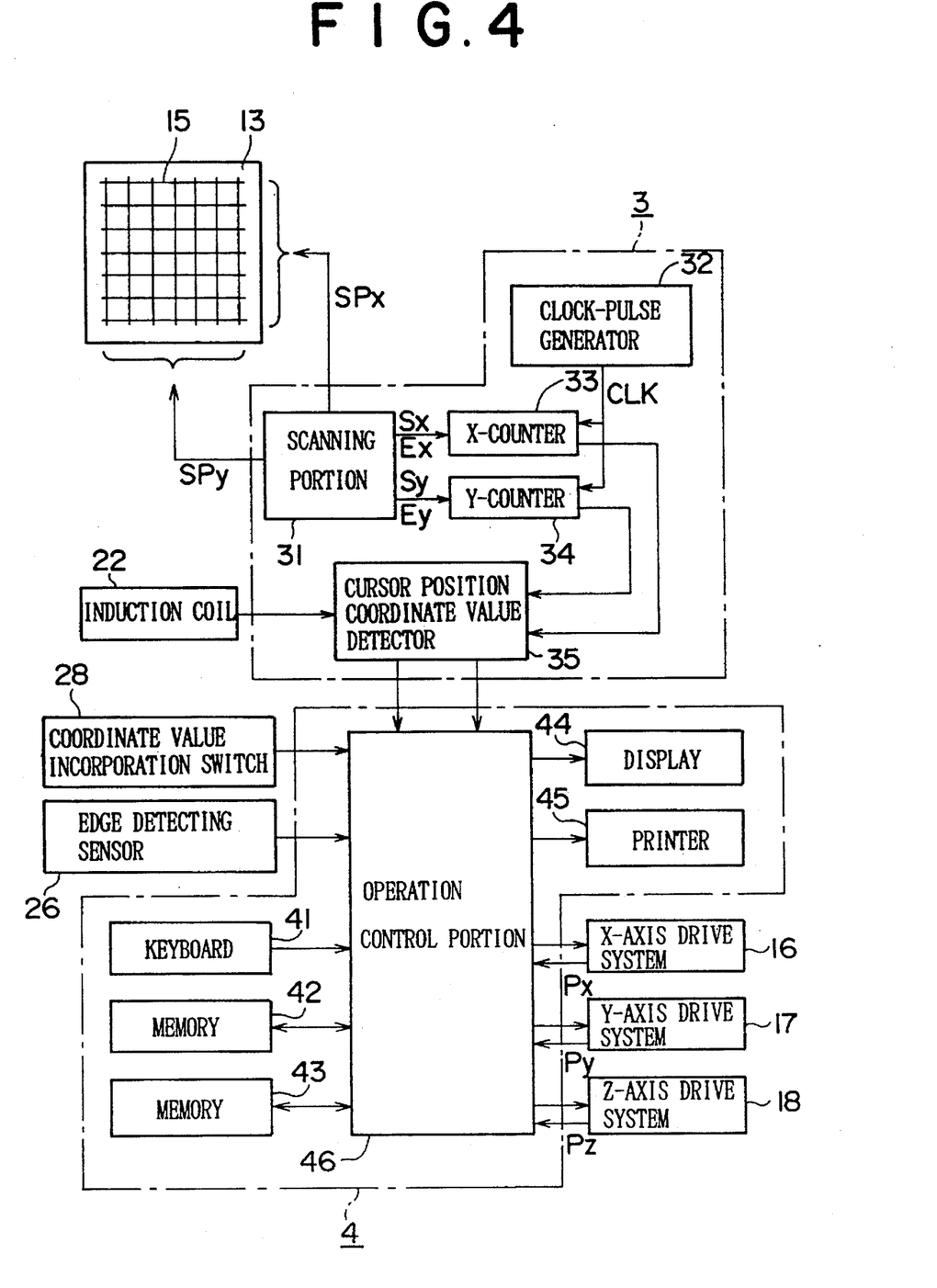
FIG. 4 is a block diagram depicting an electric circuit in the first embodiment of the present invention.

The table 12 is automatically moved in the X-, Y- and Z-axes by drive systems 16, 17 and 18, respectively, shown in FIG. 4. Movement values Px, Py and Pz of table 12 are detected by displacement detectors (not-shown). As can be noted from FIG. 4, there is provided, on the screen 13, grid pattern 15 made from conductors of electricity so that they lay in lines forming the pattern in intervals therebetween along the X- and Y-axis directions, respectively. The grid pattern 15 is provided so that they receive scan pulses successively issued from the cursor position coordinate value detecting device 3. The scan pulses are delivered to the grid pattern 15 in such a way as to be first transmitted to the X-axis direction conductors of the grid pattern 15 one by one and then done the same to the Y-axis direction conductors.

Figure 2:
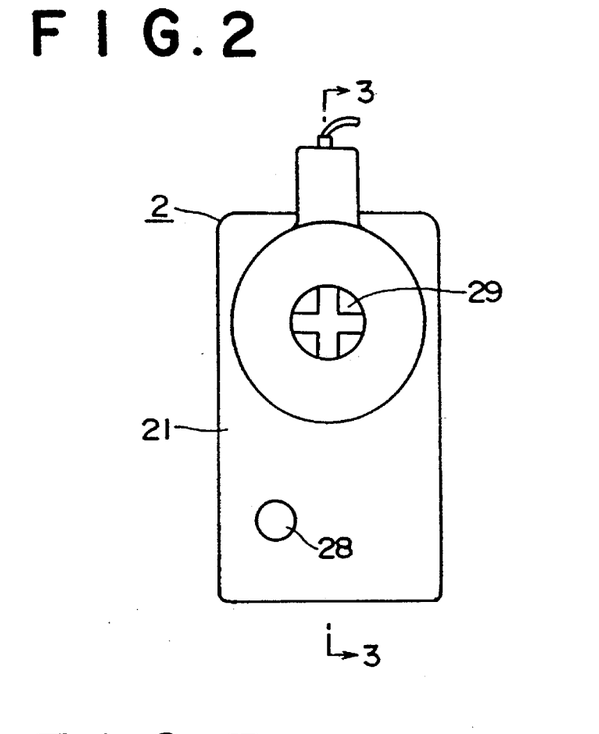
FIG. 2 is a front view of a cursor used in the apparatus shown in FIG. 1.
Figure 3:
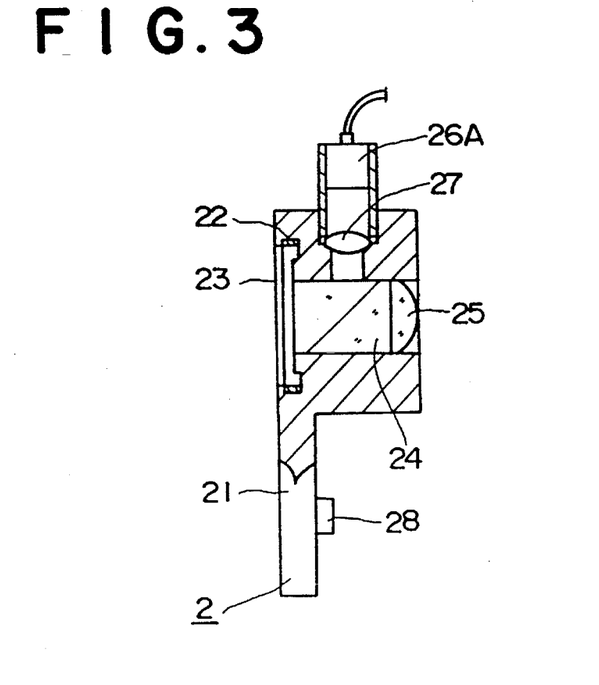
FIG. 3 is a sectional view taken along the 3—3 line in FIG. 2.

The cursor 2 is provided in a cursor body 21 which is preferably formed to smoothly move on the screen 13. The cursor body 21 is particularly provided therein with, as shown in FIGS. 2 and 3, an induction coil 22 which is wound in a ring shape to read an instant position of the cursor 2. Cursor 2 has a mark board 23 oriented near the induction coil 22 to decide incorporation points and a prism 24 oriented to a coaxial relationship with a central axis of the induction coil 22 to divide the picture image on the screen 13 into two. A magnifying lens 25 magnifies one of the divided two picture images. A photoelectric transfer 26A for the edge detecting sensor 26, a relay lens 27 for the photoelectric transfer element 26A to focus into the other of the two picture images divided by the prism 24. A coordinate value incorporation switch 28 is used to designate measuring points for the measurement. The induction coil 22 is adapted to always move parallel to the surface of the screen 13 thus to send a certain induced current. The photoelectric transfer element 26A of the edge detecting sensor 26 includes photoelectric conversion elements arranged at the center and each corner of a square which has the center corresponding to the incorporation point provided at the central portion of the induction coil 22. The mark board 23 is provided with a target 29 to define the center of the induction coil 22 and designate diagonal lines direction of the square for the photoelectric conversion elements of the photoelectric transfer 26A.

The cursor 2 is so adapted that the photoelectric transfer element 26A of the edge detecting sensor 26 temporarily coincides with the center of a reticule on the screen or with the optical axis of the optical system 14.

It will be noted from FIG. 4 that the cursor position coordinate value detecting device 3 functions to successively impress scan pulses SPx, SPy to the X-axis direction conductors and the Y-axis direction conductors defining the grid pattern 15. The cursor position coordinate value detecting device 3 includes of a scanning portion 31 that transmits scanning start signals Sx, Sy and scanning end signals Ex, Ey at the beginning and end of scanning operation. A X-counter 33 counts the number of clock-pulses sent from the clock-pulse Generator 32 in an interval between the first scanning start signal Sx and the last scanning end signal Ex from the scanning portion 31. A Y-counter 34 to count a number of clock-pulses sent form the clock-pulse generator 32 in an interval between the first scanning start signal Sy and the last scanning end signal Ey from the scanning portion 31, and a cursor position coordinate value detector 35 to read and store the respective counted numbers in the X- and Y-counters 33, 34 upon a phase inversion of output of the induction coil 22. Incidentally, the counted numbers in the X- and Y-counters 33, 34 can be cleared upon the scanning end signals Ex, Ey.

The operation control device 4 is diagrammatically illustrated in FIG. 4 includes a keyboard 41, memories 42, 43, a display 44, a printer 45 and an operation control portion 46. The keyboard 41 is used to input selection commands for selecting the setting mode or the measuring mode. When the system is in the measuring mode, keyboard 41 is employed to input designated data for measurement articles such as an article to determine the diameter and the center of a circle. The memory 42 is capable of storing the position coordinate values and operational results. The memory 43 functions to memorize the prepared measuring program. The operation control portion 46 is provided, under the setting mode, to (A): incorporate a position coordinate value of the cursor 2 detected by the cursor position coordinate value detecting device 3 when the coordinate value incorporation switch 28 is pressed, (B): calculate a relative displacement locus between the optical system 14 and the table 12 to support thereon the object M based upon the thus-incorporated position coordinate values, (C): write the measuring program including the relative displacement loous, and (D): store this measuring program in the memory 43. The operation control portion 46 is further provided, under the measuring mode, to move the optioal system 14 and the table 12 to support thereon the measuring object relatively in accordance with the relative displacement locus in the measuring program thus to incorporate the displacement values Px, Py and Pz. When the edge detecting sensor 26 detects a passage of the end of the picture image, it transmits a signal to control portion 46 indicative of the measuring object.

The above device in this invention facilitates an operative sequence as will be explained in more detailed below.

First, the setting mode is chosen on the keyboard 41 to prepare a preferable measuring program and memorize the same. The object M to be measured is mounted on the table 12 and is focused on the screen 13 as the corresponding optical picture image thereof by means of the optical system 14 so that proper measuring points in the picture image on the screen 13 are individually designated by the cursor 2. Incidentally, it will be preferable to set a rather low image magnification of, for example, 10 factor magnification, to designate measuring points widely.

Figure 5:
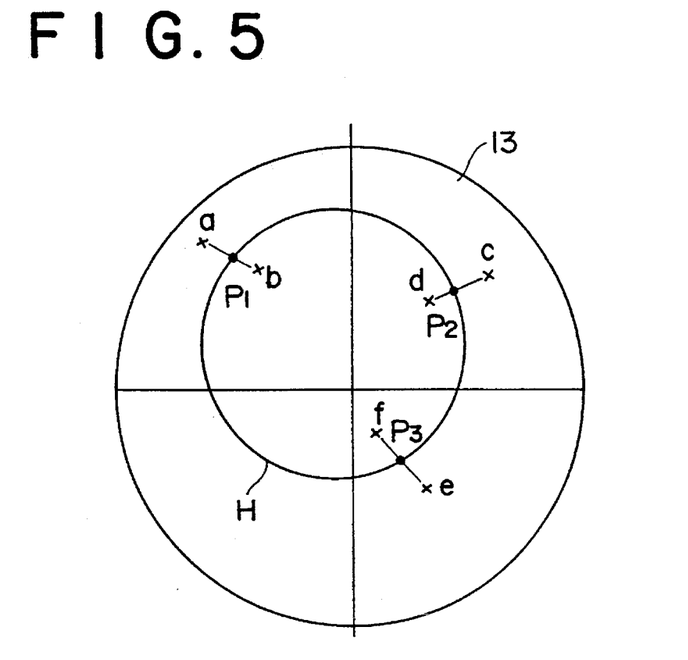
FIG. 5 is a related view depicting a process to designate measuring points according to the first embodiment.

As shown in FIG. 5, if the diameter of a hole H in a picture image state on the screen 13 is measured, the cursor 2 is carried to mark three line segments across the border line to define three individual points P1, P2 and P3 on the border circle of the hole H.

The position coordinate value of the cursor 2 is continuously renewed and memorized by the cursor position coordinate value detector 35. Upon pressing of the coordinate value incorporation switch 28 with an agreement between the target 29 and any one end "a" of the line segment across the point P1 through the lens 25, the instant position coordinate value of the cursor 2 is incorporated in the operation control portion 46 via the cursor position coordinate value detector 35.

Similarly, when the coordinate value incorporation switch 28 is pressed upon an agreement between the target 29 and the other end "b" of the line segment so as to cross the point P1 through the lens 25, the instant position coordinate value of the cursor 2 is also incorporated in the operation control portion 46 via the cursor position coordinate value detector 35. Incidentally, the end "a" of the line segment across the point P1 is considered to be a beginning coordinated value through the measurement and the other end "b" is considered to be an end coordinated value. Accordingly, an operator can conduct the mentioned measurement procedure with no fear to the measuring accuracy by just marking two points so as to cross such points on the border to be measured.

The other two points P2 and P3 can be marked in the same way as mentioned above by means of the cursor 2 to allocate the target 29 at the ends c, d and e, f of line segments across the points P2 and P3 on the border. These position coordinate values of the cursor 2 are respectively incorporated in the operation control portion 46 via the cursor position coordinate value detector 35. The operation control portion 46 defines a line segment between both position coordinate values of the ends "a" and "b", a line segment between both position coordinate values of the ends "c" and "d", a line segment between both position coordinate values of the ends "e" and "f" to estimate a coordinate movement of the table 12 so that each of these three line segments passes the center of the reticule on the screen 13 thus to prepare the measuring program referring to the coordinate movement and store the same in the memory 43. However, it is to be considered that a proper conversion of the coordinate values must occur based on the preliminary settled image magnification under the setting mode.

In an automatic measurement procedure, the prepared measuring program stored in the memory 43 is read out upon operations of the keyboard 41 after the cursor 2 is placed on the optical axis of the optical system 14 or at the center of the reticule of the screen 13. Incidentally, the measuring program is carried out under a high image magnification (e.x., 100 magnifications) to improve the measuring accuracy. The operation control portion 46 controls the coordinate movement of the table 12 in accordance with the measuring program which is read out. The table 12 is moved by the X-, Y- and Z-axis drive systems 16, 17, 18 which can be operated respectively and coordinately. If an edge of the picture image focused on the screen 13 crosses the center of the reticule, this passage is detected by means of the edge detecting sensor 26. The respective movement values Px, Py and Pz of the X-, Y- and Z-axis drive systems 16, 17, 18 are memorized in the memory 42.

In a case to measure the diameter and the center of the hole H in FIG. 5, the table 12 is first shifted to make the line segment between the position coordinate values of "a" and "b" across the center of the reticule on the screen 13. The passage of the point P1 on the border line through the reticule on the screen 13 is detected by the edge detecting sensor 26. The respective movement values of the X-, Y- and Z-axis drive systems 16, 17 and 18 are stored in the memory 42. When the position coordinate values of "c" and "d" and the position coordinate values of "e" and "f" are shifted to detect the passages of the points P2 and P3 through the center of the reticule described on the screen 13, the respective movement values of the X-, Y- and Z-axis drive systems 16, 17, 18 are memorized in the memory 42. The operation control portion 46 calculates the diameter and the center of the hole H according to these detected data to thereby indicate the calculated results on the display 44 and the printer 45.

Accordingly, in this first embodiment, the preferable measuring program can be prepared by the steps of incorporating the coordinate values of the cursor by pushing the coordinate value incorporation switch 28 provided on the cursor 2 when the cursor 2 is respectively allocated at both sides across the border of the picture image focused on the screen 13, and processing the relative displacement locus for the table 12 to move the respective line segments between the two coordinate values across the border of the picture image through the center of the reticule on the screen 13. This means that it will be enough for an operator to allocate the cursor 2 on both sides across the border of the picture image to prepare the measuring program.

As the table 12 is not directly shifted by the operator and points of the measuring object to be measured are not required to be coincident with the reticule of the screen, the whole operation procedure under this embodiment is easy and can be completed within a short period of time. Hence, a high precision measurement can be obtained by anyone.

The actual movement of the table 12 is always controlled by the prepared measuring program. When the edge detecting sensor 26 detects the edge of the picture image through the movement of the table 12, sensor 26 transmits a signal indicating edge passage to operation control portion 26. The relative displacement values are employed by operation control 46 at this time thus to calculate the necessary dimension of the measuring object. It is to be understood that the outer shape of the measuring object can be determined based on plural measuring objects.

Second embodiment

Figure 6:
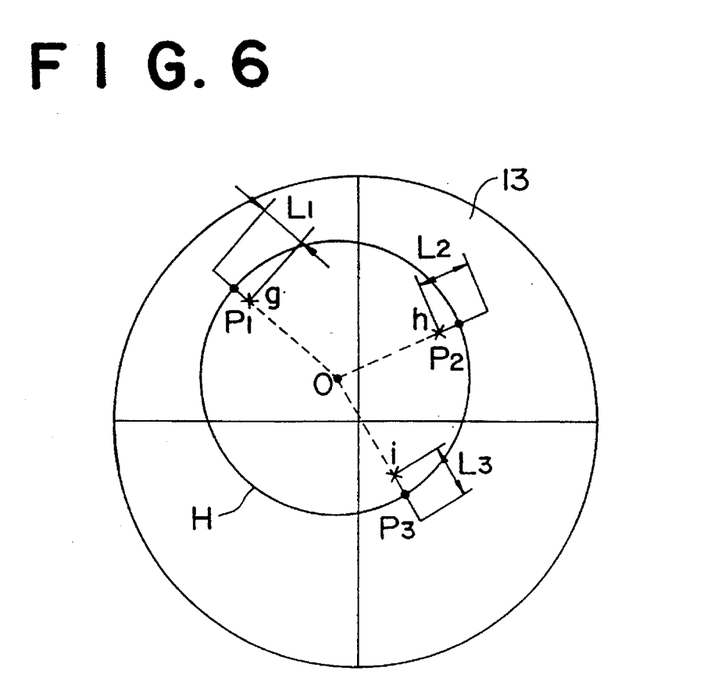
FIG. 6 is a related view depicting a measuring principle according to the second embodiment of the present invention.

The principle of the measurement in the optical measuring apparatus under the second embodiment of the present invention is depicted in FIG. 6. Incidentally, in the description of the following second embodiment, the same reference numerals will be used to designate the same or similar components as those in the first embodiment, so that the description will be omitted or simplified. However, it will be noted from the following explanation for the second embodiment that there are some differences compared with those in the first embodiment. In this version of the invention, the memory 42 preliminarily memorizes a certain overrun value (i.e., 5 mm). The operation control portion 46 has a further function to calculate a line segment which has a length corresponding to the settled overrun value and extends in a direction along a straight line from the virtual origin over the point h, i or g to calculate a movement locus of the table 12 so that the line segment passes through the reticule described on the screen 13 to thereby write an appropriate measuring program and then store the same in the memory 43.

The operative sequence will be explained in more detail below with reference to FIG. 6. If the diameter of the hole H as a picture image focused on the screen 13 is measured, the target 29 of the cursor 2 is first allocated at almost the center (=a virtual center 0) of the hole H with a visible confirmation through the magnifying lens 25 and the coordinate value incorporation switch 28 is then operated to incorporate the instant position coordinate value of the cursor 2 thus to send the operation control portion 46 via the cursor position coordinate value detector 35. Incidentally, this virtual center 0 will be used in the following process as a virtual origin.

Next, the target 29 is moved to a point g slightly inside of any point P1 on the border line of the hole H and the instant position coordinate value of the cursor 2 is then incorporated and stored in the operation control portion 46 through the cursor position coordinate value detector 35.

Remaining points h and i slightly inside of any two points P2 and P3 on the border line of the picture image are designated by the target 29 as those in the point g thus to be stored in the operation control portion 46 through the cursor position coordinate value detector 35.

The operation control portion 46 calculates a line segment L1, L2 and L3 each of which has a length corresponding to the settled overrun value, that is, 5 mm, and extends in a direction along a straight line from the virtual origin 0 over the point h, i or g to calculate a movement locus of the table 12 so that the line segment passes through the reticule described on the screen 13 to thereby write an appropriate measuring program and then store the same in the memory 43. Incidentally, an automatic measurement procedure under the second embodiment will be the same as those in the first embodiment of the present invention.

Accordingly, as the cursor 2 is carried near the border line of the picture image of the measuring object and the respective coordinate values of the cursor 2 are detected by pushing the coordinate value incorporation switch 28, such proper measuring program can be made to move the line segment having the predetermined overrun value through the reticule on the screen 13, which results in reduced measuring work.

The points P1, P2 and P3 could be designated directly instead of the above mentioned points g, h and i which are slightly inside of the border line of the hole H. The direction of the line segment extending from the point g, h or i could be preliminary or occasionally determined in one direction without the virtual origin 0. The overrun value can be naturally changed upon design changes.

Third embodiment

An optical measuring apparatus according to the third embodiment of the present invention will be described in FIGS. 7–9. Incidentally, in the description of the following embodiment, the same reference numerals will be used to designate the same or similar components as those in the first embodiment, so that the description will be omitted or simplified.

In this third embodiment, the screen 13 and the cursor position coordinate value detecting device 3 are still used as in the first and second embodiments. Particularly, the cursor position coordinate value detecting device 3 used in the first or second embodiment is termed as the first cursor position coordinate value detecting device 3 in this embodiment.

Figure 7:
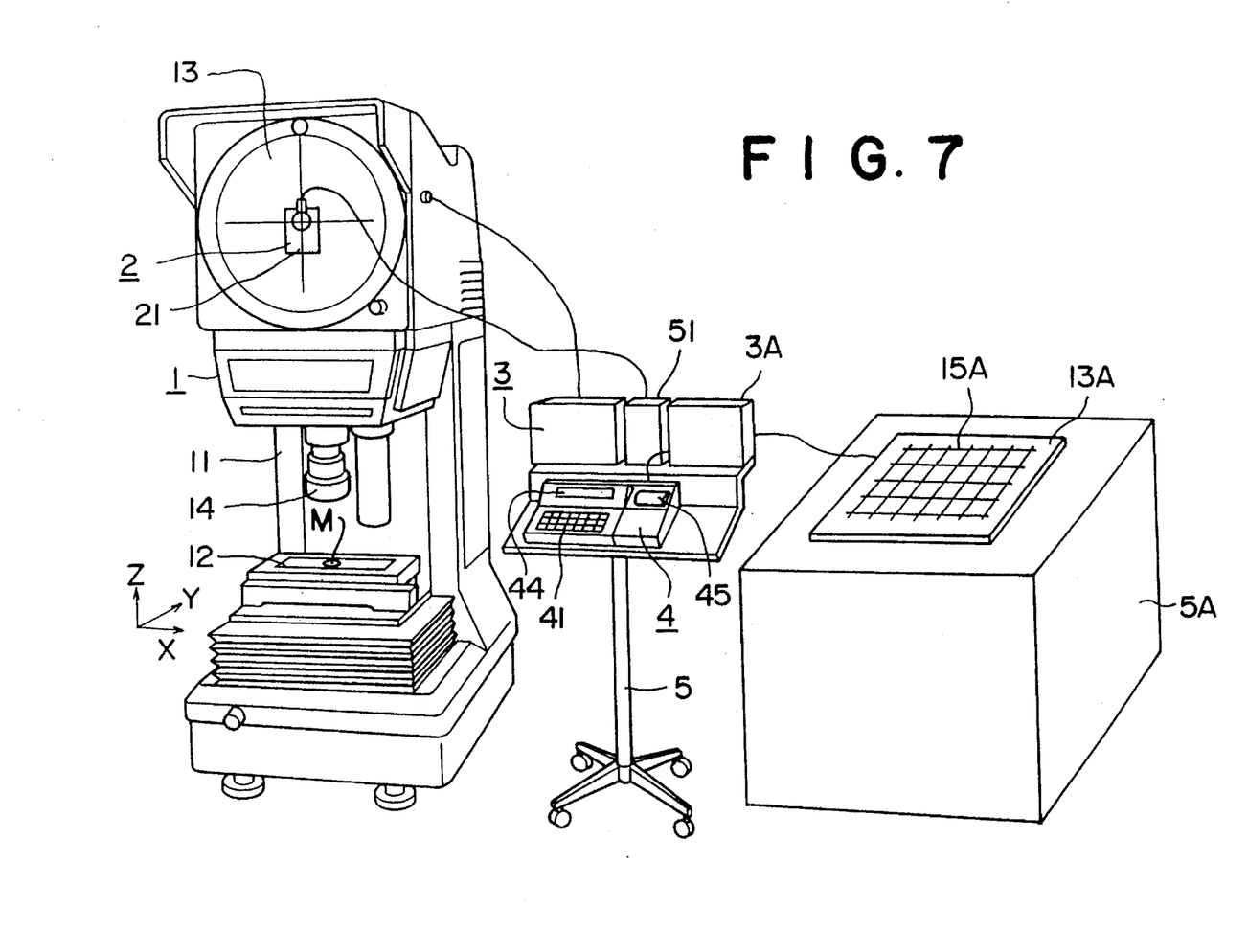
FIG. 7 is a perspective view of the appearance of the overall composition of the optical measuring apparatus according to the third embodiment of the present invention.
Figure 8:
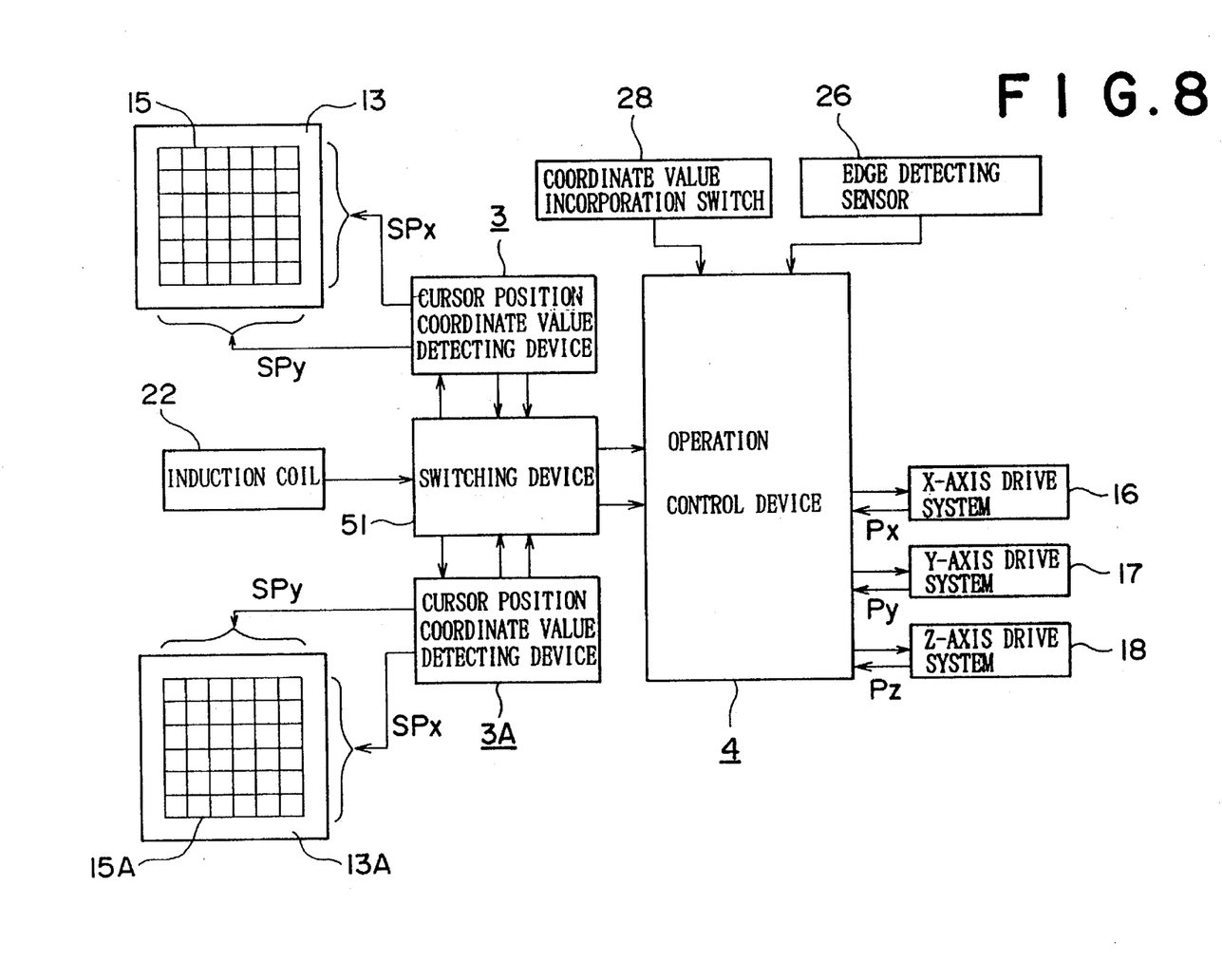
FIG. 8 is a block diagram depicting an electric circuit in the third embodiment of the present invention.

The third optical measuring apparatus comprises the screen 13, the first cursor position coordinate value detecting device 3, a bright board 13A, a second cursor position coordinate value detecting device 3A, and a switching device 51 as depicted in FIGS. 7 and 8. Incidentally, a reference numeral 5A designates a table preferably supporting the bright board 13A.

The bright board 13A is formed in a flat shape and made from a bright material. The bright board 13A is provided thereon with a grid pattern 15A defined by conductors of electricity laid in a certain intervals therebetween along the X- and Y-axis directions just like the screen 13. The conductors defining the grid pattern 15A is capable of being impressed by scan pulses issued from the second cursor position coordinate value detecting device 3A. The second cursor position coordinate value detecting device 3A includes the scanning portion 31, the clock-pulse generator 32, the X-counter 33, the Y-counter 34, and the cursor position coordinate value detector 35 as those in the first cursor position coordinate value detecting device 3 shown in FIG. 4. The switching device 51 is capable of switching signals from the induction coil 22 to one of the two cursor position coordinate value detectors 35, 35 for the first and second cursor position coordinate value detecting devices 3, 3A, so that the coordinate values from either cursor position coordinate value detectors 35, 35 for the first and second cursor position coordinate value detecting devices 3, 3A are stored in the operation control device 4.

Figure 9:
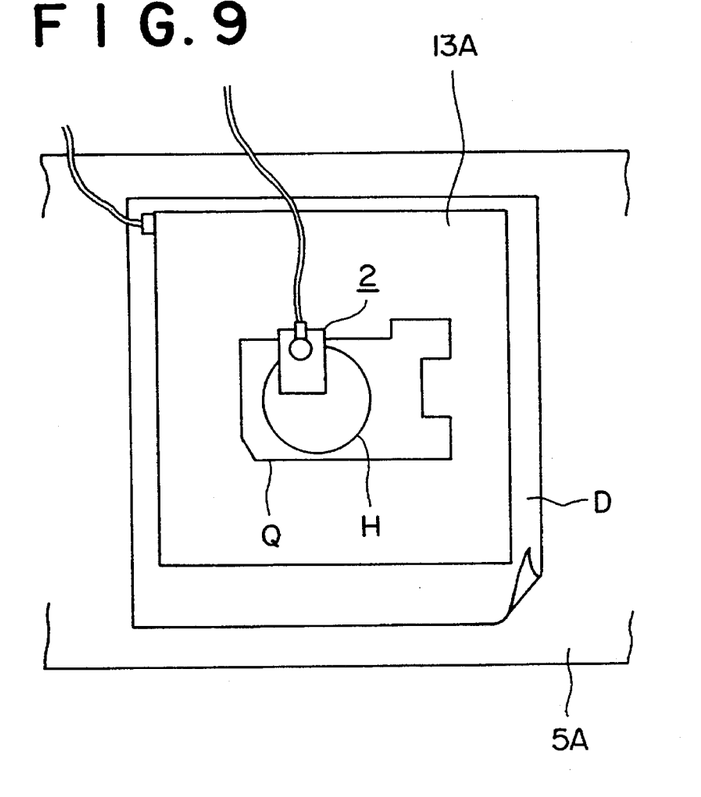
FIG. 9 is a related view depicting a process to designate measuring points according to the third embodiment.

As can be seen from FIG. 9 for the third embodiment, if a plan D of the measuring object is laid under the bright board 13A, an operator can confirm a configuration Q or a hole H through the bright board 13A. Incidentally, the measuring object drawn on the plan is mounted on the table 12.

Any two or one point on the plan which is confirmed through the bright board 13A can be designated by means of the cursor 2 as those in the above mentioned first and second embodiments to calculate a line segment between the two position coordinate values for the two designated points or a line segment which extends from the one designated point in a predetermined direction with a certain length to thereby make a proper measuring program so that the line segment is moved by the table 12 to pass over the reticule of the screen 13. The magnification ratio for the plan D is naturally considered well as in the other embodiments.

An automatic measurement to move the table 12 and the optical system 14 relatively in this third embodiment can be conducted, as in the first and second embodiments, after coinciding with the optical axis of the optical system or the reticule on the screen 13.

Accordingly, this third embodiment naturally attains the same effects as those in the first and second embodiments and does not require a genuine article of the measuring object for the measurement but can conduct the necessary measurement with the plan D easily and simply.

Although particular preferred embodiments of the invention have been disclosed in detail for illustrative purpose, it will be recognized that variations or modifications of the disclosed apparatus, including the rearrangement of parts, lie within the scope of the present invention.

Taking for an example, the edge detecting sensor 26 is not definitely required to be integrally provided in the cursor 2 but could be provided separately from the cursor 2. The edge detecting sensor 26 is not always necessary to be positioned at the reticule on the screen 13 but could be allocated on a predetermined place or could be accompanied with the screen 13. When the edge detecting sensor 26 is accompanied with the screen 13, it will be preferable to be oriented to a coaxial relationship with a central axis of the optical system 14, that is, the reticule of the screen 13. Such an arrangement does not cause a strain of the optical picture image and does not require to renew the measuring program when the multiplying factor for the picture image is changed.

The cursor position coordinate value detecting devices 3 and 3A could be replaced with other devices which are capable of detecting respective position coordinate values of the cursor 2. The table 12 could be provided stationarily if the optical system 14 will be able to move as the table 12 use in the first—third embodiments.

Figure 10:
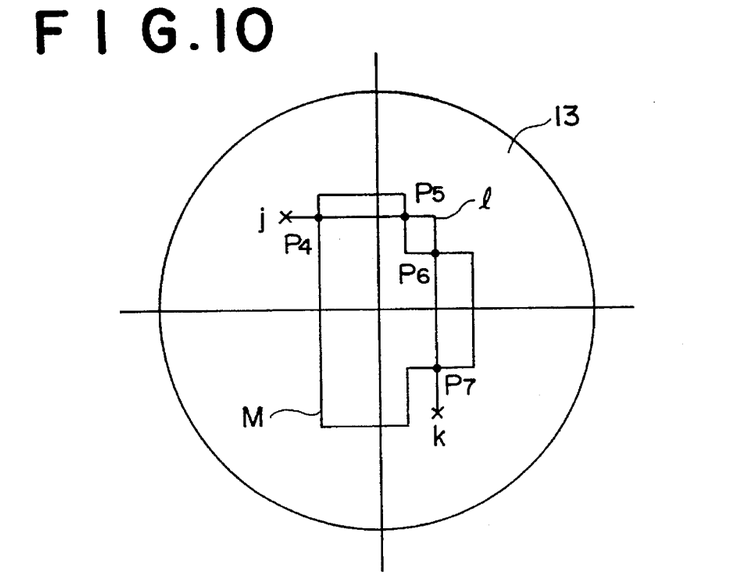
FIG. 10 is a related view depicting a measuring principle according to a modification of the present invention.

Each of the mentioned line segments extending from the points a—i could be an arc state curve or a refraction line. Taking for an instance in FIG. 10, when designating the points j and k outside of the measuring object M, a refraction line having two end points j and k and turning by a right angle at a point 1 is prepared to across the measuring object M through edges P4 to P7, so that dimensions between the edges P4 and P5 and the edges P6 and P7 can be obtained.

As has been mentioned, the optical measuring apparatus according to the present invention can be operated easily and simply by any operators.

What is claimed is:

1. An optical measurement apparatus for measuring the shape of an object, the object having an edge, said apparatus including:

a projection system including a projection system screen, said projection system being configured to present an image of the object on said projection system screen around a projection system optical axis so that the edge of the object image is visible;

a displacement system for relatively shifting the object or said projection system so that the object image on said projection system screen shifts location on said screen relative to said projection system optical axis, said displacement system having a displacement system initial position at which the object image is presented at an object image initial position on said projection system screen and being configured to shift the location of the object image from the object image initial position in response to displacement system drive signals applied thereto and configured to generate displacement system position signals representative of the shift of said displacement system from the displacement system initial position;

an optical edge detector disposed on said projection system screen, said optical edge detector being configured to monitor the object image presented on said projection system screen at a point defined by an intersection of said projection system optical axis with said projection system screen and to generate an edge-sensed signal when, as the object image on said projection system screen shifts positions, the edge of the object image crosses said projection system optical axis and said optical edge detector;

a cursor assembly, said cursor assembly including a movable cursor for placement on said projection system screen and a cursor position detector at least partially disposed on said projection system screen, said cursor position detector being configured to generate cursor position signals representative of cursor position points of said moveable cursor on said projection system screen relative to the object image initial position on said projection system screen; and a control unit connected to said cursor assembly for receiving said cursor position signals, to said displacement system for applying said displacement system drive signals thereto and for receiving said displacement system position signals therefrom and to said optical edge detector for receiving said edge-sensed signals therefrom, said control unit being configured to:

generate said displacement system drive signals based on said cursor position signals so as to cause the shifting of said displacement system from the displacement system initial position so that the object image shifts position on said projection system screen across said projection system optical axis and across said optical edge detector along a plurality of paths of travel, each said path of travel intersecting at least one said cursor position point represented by said cursor position signals received by said control unit; and receive said edge-sensed signals and said displacement system position signals as the object image moves across said projection system screen as a result of the shifting of said displacement system so as to collect data representing a plurality of points at which the shift of the displacement system from the displacement system initial position results in the edge of the object image being detected.

2. The optical measurement apparatus of claim 1, wherein said displacement system includes a table on which the object is placed and said table includes drive elements adapted to receive said displacement system drive signals so as shift said table and the object on said table relative to said projection system so as to shaft the object image on said projection system screen from the object image initial position on said projection system screen.

3. The optical measurement apparatus of claim 1, wherein said cursor position detector includes a multi-line grid pattern formed on said projection system screen, said grid lines being adapted to be selectively energized and a transducer disposed in said movable cursor that generates a cursor transducer signal when adjacent ones of said grid lines are energized; and a detector controller that monitors the energization of said grid lines and said cursor transducer signal that, based on said monitoring, generates said cursor position signals.

4. The optical measuring apparatus of claim 1, wherein said edge detector is attached to said movable cursor.

5. The optical measurement apparatus of claim 1, wherein said control unit generates said displacement system drive signals so that the paths of travel of the object image across said projection system screen and across said edge detector are straight line segments.

6. The optical measurement apparatus of claim 1, wherein said control unit is configured to generate said displacement system signals to cause the object image to shift position on said projection system screen for each path of travel based on received cursor position signals representative of two distinct cursor position points.

7. The optical measurement apparatus of claim 1, wherein said control unit is configured to generate said displacement system signals to cause the object image to shift position on said projection system screen for the paths of travel based on received cursor position signals representative of a common cursor position point and a plurality of distinct cursor position points, wherein each said path of travel is based on the common cursor position point and intersects a separate one of the distinct cursor position points.

8. An optical measurement apparatus for measuring the profile of an object, the object having an edge, said apparatus including:

a projection system including a projection system screen, said projection system being configured to present an image of the object on said projection system screen around a projection system optical axis so that the edge of the object image is visible;

a displacement system for relatively shifting the object or said projection system so that the object image on said projection system screen shifts location on said projection system screen relative to said projection system optical axis, said displacement system having a displacement system initial position at which the object image is presented at an object image initial position on said projection system screen and being configured to shift the location of said object image in response to displacement system drive signals applied thereto and configured to generate displacement system position signals representative of the shift of said displacement system from the displacement system initial position;

an optical edge detector disposed on said projection system screen, said optical edge detector being configured to monitor the object image presented on said screen at a point defined by an intersection of said projection system optical axis with said projection system screen and to generate an edge-sensed signal when, as the object image on said screen shifts positions, the edge of the object image crosses said projection system optical axis and said edge detector;

a flat bright board;

a cursor adapted to be moved over said projection system screen and said bright board;

a first cursor position detector at least partially disposed on said projection system screen, said first cursor position detector being configured to monitor the position of said cursor on said screen and to generate first cursor position signals representative of points on said projection system screen over which said cursor is located;

a second cursor position detector at least partially disposed on said bright board, said second cursor position detector being configured to monitor the position of said cursor on said bright board and to generate second cursor position signals representative of points on said bright board over which said cursor is located; and a control unit connected to said first cursor position detector for receiving said first cursor position signals, to said second cursor position detector for receiving said second cursor position signals, to said displacement system for applying said displacement system drive signals thereto and for receiving said displacement system position signals therefrom and to said optical edge detector for receiving said edge-sensed signals therefrom, said control unit being configured to:

generate said displacement system drive signals based on said first cursor position signals or said second cursor position signals so as to cause the shifting of said displacement system from said displacement system initial position so that the object image shifts position on said projection system screen across said optical axis and said optical edge detector along a plurality of paths of travel, each said path of travel passing through at least one point corresponding to a point over which the cursor was located on said projection system screen or on said bright board; and receive said edge-sensed signals and said displacement system position signals as the object image moves across said projection system screen as a result of the shifting of said displacement system so as to collect data representing a plurality of points at which the shift of the displacement system from the displacement system initial position results in the edge of the object image being detected.

9. The optical measurement apparatus of claim 8, wherein each object image path of travel is defined by two points inputted by said cursor, wherein when said cursor is employed to input points from said bright board, said control unit causes the displacement of said object image through points on said projection system screen that correspond to the inputted bright board points.

10. The optical measurement apparatus of claim 8, wherein each object image path of travel is a line segment and said control unit is further configured to cause said object image to move across said edge detector along paths of travel based on received cursor position signals representative of a common cursor position point and a plurality of distinct cursor position points so that each path of travel is based on the common cursor position point and intersects a separate one of the distinct cursor position points and when cursor position points are based on points inputted from said bright board, said control unit causes the displacement of said object image from points on said projection system screen that correspond to the inputted bright board points.

11. The optical measurement apparatus of claim 8, wherein: said first cursor position detector includes a multi-line grid pattern formed on said projection system screen said grid lines that is adapted to be selectively energized; said second cursor position detector includes a multi-line grid pattern formed on said bright board that is adapted to be selectively energized; said cursor includes a transducer that generates a cursor transducer signal when adjacent ones of said grid lines on said projection system screen or said bright board are energized; and each said cursor position detector includes a detector control that monitors the energization of said associated grid lines and said cursor transducer signal and that, based on said monitoring, generates said cursor position signals.

12. A method of measuring the shape of an object having an edge, said method including the steps of:

forming a projection of an initial image of the object on a screen so that the edge of the object image is visible on said screen, the initial image of the object being focused along an optical axis of the projection;

inputting with a cursor placed on said screen a plurality of scanning paths, each said scanning path being located to cross the edge of the initial image of the object presented on said screen;

selectively displacing the projection of the object image on said screen relative to the initial image of the object presented on said screen so that the object image shifts location on said screen along scanning lines that cross the optical axis of the projection, said scanning lines corresponding to said inputted scanning paths;

monitoring the edge crossing of the object image as the edge of the object image crosses the optical axis of the projection as the object image moves along said scanning lines; and recording the instances of the edge crossings of the object image and recording the displacement of the object image relative to the initial image of the object presented on said screen at the edge crossings so as to compile data representative of a plurality of points at which the edge crossing of the object image was detected.

13. The method of measuring the shape of an object of claim 12, wherein the object is held on a table and a projection system directed at the table is used to form said projection of the object image on said screen, and said step of selectively displacing the projection of the object image on said screen includes the step of moving the table relative to the projection system; and said step of recording the displacement of the object image includes the step of monitoring the movement of the table as the table moves the object along said scanning lines.

14. The method of measuring the shape of an object of claim 12, wherein said step of inputting said scanning paths includes the step of inputting on said screen for each said scanning path a start point and an end point wherein said cursor is used to indicate on said screen said start point and said end point.

15. The method of measuring the shape of an object of claim 12, wherein: said step of inputting said scanning paths includes the step of inputting on said screen for each said scanning path a start point; and said step of selectively displacing the projection of the object image involves moving shifting said object image along scanning paths that extend a preselected distance from said start points.

* * * * *